US012225161B2

(12) United States Patent
Liu et al.

(10) Patent No.: US 12,225,161 B2
(45) Date of Patent: Feb. 11, 2025

(54) BLOCKING CONFERENCE AUDIO OUTPUT

(71) Applicant: Hewlett-Packard Development Company, L.P., Spring, TX (US)

(72) Inventors: He-Di Liu, Taipei (TW); Ting Fong Wang, Taipei (TW); Hsin-Chih Lin, Taipei (TW); Xin-Chang Chen, Taipei (TW); Yao Cheng Yang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 99 days.

(21) Appl. No.: 18/335,831

(22) Filed: Jun. 15, 2023

(65) Prior Publication Data
US 2024/0422265 A1 Dec. 19, 2024

(51) Int. Cl.
*H04M 3/56* (2006.01)
*H04M 9/08* (2006.01)

(52) U.S. Cl.
CPC ........... *H04M 3/568* (2013.01); *H04M 9/082* (2013.01)

(58) Field of Classification Search
CPC ........ H04M 9/082; H04M 3/568; H04M 3/56; H04M 3/567; H04M 3/002; H04M 1/6033
See application file for complete search history.

(56) References Cited

U.S. PATENT DOCUMENTS

| 6,563,925 | B1 | 5/2003 | Krasny | |
|---|---|---|---|---|
| 8,144,863 | B2 | 3/2012 | Son | |
| 8,391,126 | B2 | 3/2013 | James et al. | |
| 2005/0213732 | A1* | 9/2005 | Rodman | H04M 3/567 |
| | | | | 379/202.01 |
| 2014/0355752 | A1* | 12/2014 | Sorensen | H04M 3/002 |
| | | | | 379/406.06 |
| 2016/0189726 | A1* | 6/2016 | Raniwala | G06F 3/165 |
| | | | | 704/227 |
| 2017/0316676 | A1* | 11/2017 | King | G08B 21/0492 |
| 2018/0077205 | A1* | 3/2018 | Fang | G10L 21/0216 |
| 2020/0195783 | A1 | 6/2020 | Yuzuriha | |
| 2021/0144021 | A1* | 5/2021 | Casas | H04L 12/1827 |
| 2022/0141341 | A1* | 5/2022 | Tu | H04M 3/568 |
| | | | | 379/202.01 |
| 2023/0421704 | A1* | 12/2023 | Chen | H04B 3/23 |
| 2024/0098413 | A1* | 3/2024 | Litman | H04W 76/11 |

FOREIGN PATENT DOCUMENTS

| EP | 2987316 A1 | 2/2016 |
|---|---|---|
| WO | 2014/193874 A1 | 12/2014 |

\* cited by examiner

*Primary Examiner* — Akelaw Teshale (74) *Attorney, Agent, or Firm* — Knobbe, Martens, Olson & Bear, LLP (57) ABSTRACT

An example electronic device includes a network communication interface to connect to a conference server, a central control device communication interface to connect to a local central control device, a microphone and a processor. The processor is to receive audio at the microphone and send the audio to the local central control device and to the conference server. The processor is to send the audio to the local central control device such that it is received by a nearby electronic device before the audio is received from the conference server by the nearby electronic device.

20 Claims, 4 Drawing Sheets

BLOCKING CONFERENCE AUDIO OUTPUT

BACKGROUND

Computing devices within audio output range of each other risk acoustic echoes that degrade the audio quality and overall user experience. Echoes may occur when two computing devices are connected to the same video call within the same space. When a user speaks into a first device, a nearby listener can hear the speaking user both naturally and through the speaker of a second device. The speaker output can then be picked up by the microphone of the first device and re-emitted through the speaker causing a feedback loop that affects the video call.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Generally described, user devices on a conference call can connect through a local central control device and a conference call server. The local central control device, used in conjunction with a conference call server, may enable electronic devices, such as local user devices that are nearby or in proximity to each other, to avoid experiencing audio echo. In some examples, the local user devices transmit audio signals to other local user devices via the local central control device. The local user devices may transmit the same audio signals provided to the server to be output through the speakers of all user devices on the conference call. Once a local user device receives an audio signal from the server, the local user device compares the audio signal from the server to all audio signals received from local user devices via the local central control device. Matching signals indicate that the audio signal from the server was captured by a local user device within microphone range of the other local user devices and, if output through the speakers, would cause the originating microphone to capture the same audio to be transmitted from all the participating host computing devices.

More specifically, a first local user device and a second local user device can log onto a conference call with a third, remote user device, by connecting via a network to a server hosting the conference call. The server can connect the first local user device and the second local user device to the remote user device (the third, remote user device) via the network and the server. The first local user device and the second local user device can also communicatively connect to a local central control device that may be only accessible to devices within a certain distance from the local central control device. For example, only first and second local user devices located within the same room, or within short-range wireless communication distance from the local central control device may be able to connect to the local central control device. A first user of the first local user device located within an audio signal detection range can speak into the microphone coupled to the first local user device. The first local user device, at the microphone, can capture an audio signal and transmit the audio signal to the sever via a network and to the local central control device. The local central control device can deliver the signal to the second local user device. The server can then deliver the same audio signal to the second local user device. After receiving the audio signal from the server, the local user device can compare the audio signal received from the local central control device and the audio signal from the server. As they are both the audio signal created by the first user at the first local user device, the second user is nearby such that they have likely heard the audio signal as it was being created by the first local user, and therefore, outputting the audio at the second local user device would cause the second local user, and likely the first local user, to hear the audio a second time. Additionally, the second local user device is nearby to the first local user device, such that outputting the audio at the second local user device may cause the audio to be captured by the microphone of the first local user device for a second time, thereby causing feedback or echo to occur. To limit the echo, the second local user device, upon determination that the audio signals are the same, can prevent or block output of the audio signal through speakers of the second user device. To prevent or block output of the audio signal can include cancelling, filtering or otherwise removing the audio signal from a signal to be output through speakers of the second user device.

Alternatively, if a remote user creates a remote audio signal at a microphone of the remote user device, the remote user device transmits the remote audio signal to the server. The remote user is remote from the second user and the local central control device, and therefore does not communicate with the local central control device. The second local user device receives the remote audio signal from the sever via a network. The second local user device compares the remote audio signal to audio signals received from the local central control device. Upon determination that the remote audio signal is distinct from the audio signals received from the local central control device (or if no corresponding audio signal is received from the local central control device), the second local user device outputs the remote audio signal from the local central control device.

Figure 1:
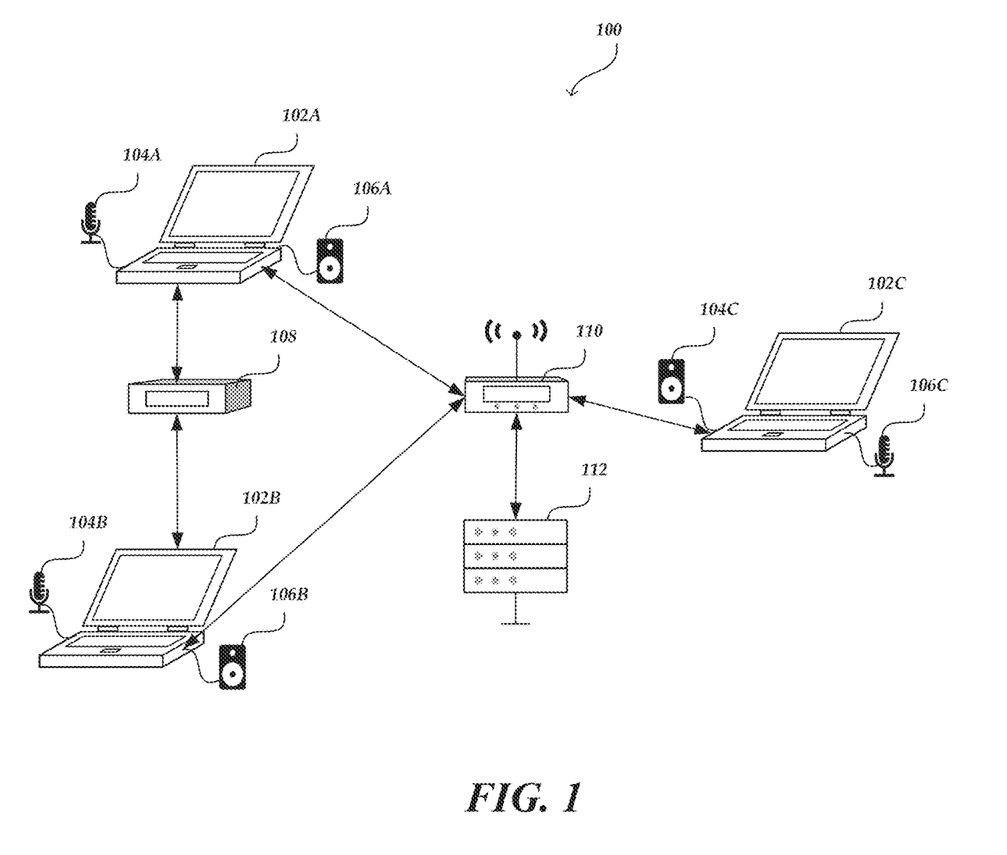
FIG. 1 is a pictorial diagram depicting example user devices, such as workstation computers, that can communicate via a network, server, and a central control device to limit echo between local user devices.

FIG. 1 is a pictorial diagram depicting a first local user device 102A and a second local user device 102B, that can communicate with a third, remote user device 102C (e.g., sometimes referred to as electronic devices) via a network 110, a conference server 112, and a local central control device 108 to limit echo between the first local user device 102A and the second local user device 102B. First and second local user devices 102A, 102B are located within microphone 104B audio signal detection range (e.g., nearby) each other. For example, the first local user device 102A is a nearby the second local user device 102B (e.g., a nearby electronic device) if the output from speaker 106B coupled to the second local user device 102B can be captured by microphone 104A coupled to the first local user device 102A. User devices 102A, 102B, 102C, may be electronic devices that can include workstation computers, laptop computers, tablet, notebook computers, desktop computers, personal digital assistant (PDA), hybrid PDA/mobile phone, smart wearable device (such as a smart watch), mobile phone, smartphone, gaming consoles, and any other computing devices capable of communicating via a network, or a combination thereof. In some examples, the first and second local user devices 102A and 102B may communicate directly or indirectly via the network 110 with the conference server 112. In some examples, the first and second local user devices 102A and 102B may communicate directly or indirectly with the local central control device 108. First and second local user devices 102A and 102B may indirectly connect to the local central control device 108 through a network, as well. For example, the local central control device 108 may by connected using wired connections including, but not limited to twisted pair wires, coaxial cable, ethernet, fiber-optic, and category cables. The first and second local user devices 102A, 102B may connect to the local central control device 108 using wireless connections including, but not limited to satellite communication, infrared communication, broadcast radio, microwave communication, WI-FI® communication (e.g., according to an IEEE 802.11 wireless standard), BLUETOOTH® communication (e.g., a short-range radio frequency-based technology, such as according to an IEEE.802.15.1 standard), and mobile communication systems. Although depicted in FIG. 1 as a separate device, the local central control device 108 can be part of the first and second local user devices 102A and 102B.

To enable interaction between the first and second local user devices 102A and 102B and local central control device 108, the first and second local user devices 102A and 102B can include a frontend interface that transmits or sends audio signals from the first local user device 102A to the local central control device 108 and receives the audio signals at the second local user device 102B from the local central control device 108. In some examples, the first and second local user devices 102A, 102B and the third, remote user device 102C include a server frontend interface that can enable transmission of audio signals to the conference server 112 via the network 110 and receipt of audio signals from the conference server 112. To enable audio call functionality, the audio transmission from the first local user device 102A can additionally be sent through the network 110 to the conference server 112. The audio signal can be transmitted from the conference server 112 to all connected devices, such as second local user device 102B and third, remote user device 102C.

Figure 2:
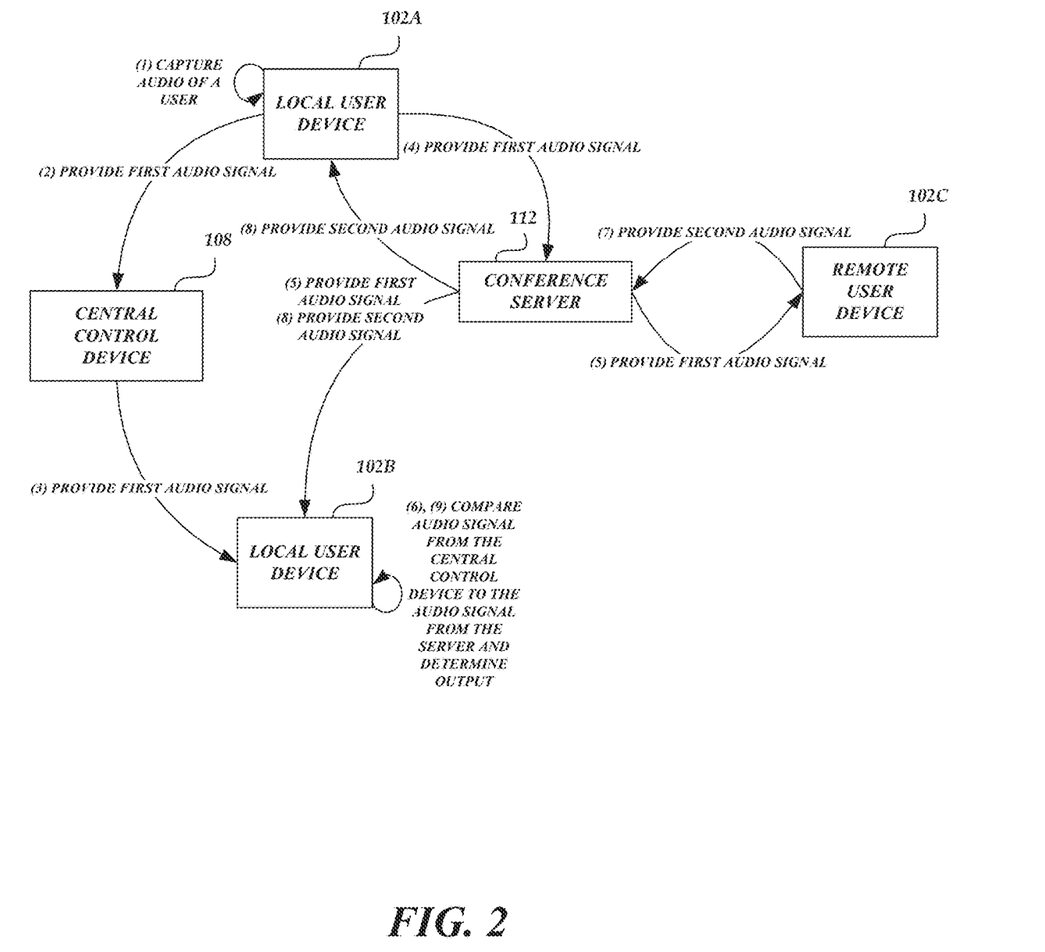
FIG. 2 is a block diagram depicting example interactions between local user devices of user devices, a remote user device of the user devices, a server, and a central control device as shown in FIG. 1.

FIG. 2 is a block diagram depicting example interactions between the first and second local user devices 102A and 102B, the remote user device 102C, the conference server 112, and the local central control device 108, such as shown in FIG. 1. Audio is captured at the first local user device 102A and transmitted to the second local user device 102B via the conference server 112 and the local central control device 108. The captured audio is transmitted to the third, remote user device 102C via only the conference server 112. To limit audio echo at the first and second local user devices 102A and 102B, the second local user device 102B can utilize audio signals transmitted from the first local user device 102A through the local central control device 108 and audio signals transmitted from the third, remote user device 102C via the conference server 112.

In this regard, at (1) the first local user device 102A captures a first audio signal of a first user of the first local user device 102A. The first audio signal can be captured using a microphone 104A, as seen in FIG. 1. The microphone 104A may be integrated into the first local user device 102A or may be communicatively coupled to the first local user device 102A. The first audio signal may be limited to only speech of the first user depending on the sensitivity of the microphone. The first local user device 102A provides the first audio signal to the local central control device 108 at (2). To transmit the first audio signal to the local central control device 108, the first audio signal may be transformed or converted into a format or using a communication protocol that is accessible by the local central control device 108. For example, the local user device 102A may be connected to the local central control device 108 via a wireless signal or other communication protocol. The first local user device 102A may separate the first audio signal into packets transmittable to the local central control device 108. In some examples, the local user device 102B may connect to the local central control device 108 using an IEEE 802.15.1 wireless standard (e.g., BLUETOOTH®), wireless wide area network (WWAN), 4G, 5G, or wired connections such as ethernet. In one nonlimiting example, the first audio signal may be transformed to be in an appropriate format to be transmitted according to the IEEE 802.15.1 wireless standard.

At (3), the local central control device 108 provides the first audio signal to the second local user device 102B. In some examples, the first audio signal may include a timestamp associated with the first audio signal set by the first local user device 102A upon creation of the first audio signal. Upon receipt of the first audio signal by the second local user device 102B, in some examples, the second local user device 102B will check the timestamp and determine how much time has passed since the creation of the first audio signal. The second local user device 102B stores the first audio signal on the determination that the time that has elapsed since creation of the first audio signal, or the particular time period after receiving the first audio signal, does not exceed a threshold. The second local user device 102B discards the first audio signal without completing an activity or a task with the first audio signal (e.g., without further processing or without outputting the first audio signal to a speaker) if the time that has elapsed since the creation of the first audio signal exceeds a threshold. In some examples, the threshold represents a particular time period that is acceptable to store the first audio signal. The threshold may be 20 milliseconds.

At (4), the first local user device 102A provides the first audio signal to the conference server 112. The first audio signal may be transmitted to the conference server 112 over the network 110 as illustrated in FIG. 1. The first local user device 102A, network 110, or the conference server 112 may have size constraints. As described above when transmitting the first audio signal to the local central control device 108, the first local user device 102A may segment the first audio signal to transmittable pieces that can be provided to the conference server 112. The server, at (5), provides the first audio signal to the second local user device 102B and the third, remote user device 102C via the network 110. The first audio signal is provided to the third, remote user device 102C to be output from the speaker 106C of the remote user device 102C. The first audio signal is provided to the second local user device 102B, for further processing, such as to determine whether it should be output from the speaker 106B of the second local user device 102B. After receiving the first audio signal, the second local user device 102B compares the first audio signal received from the local central control device 103 at (3) with the first audio signal from the conference server 112 at (5). At (6), the second local user device 102B determines if the first audio signal should be output from the speaker 106B. If the received signals match, the first audio signal is prevented or blocked from being output from the speaker 106B.

At (7), the remote user device 102C creates and provides a second audio signal to the conference server 112 via the network 110. The conference server 112 provides the second audio signal at (8) to the first and second local user devices 102A and 102B. The first local user device 102A can, in some examples, immediately output the second audio signal through the speaker 106A. At (9), the second local user device 102B, upon receipt of the second audio signal from the conference server 112, compares the second audio signal to the any audio signals received from the local central control device 108. If the signals do not match, the second local user device 102B outputs the second audio signal from the speaker 106B.

In some examples, the second local user device 102B can receive the first audio signal from the local central control device 108 at least 20 ms before receiving the second audio signal from the conference server 112. To ensure that the first audio signal is received prior to the second audio signal, in some examples, the first local user device 102A can delay providing the first audio signal to the local central control device 108 for 20 ms (or for a delay period other than 20 ms) following the transmission of the second audio signal to the conference server 112.

In some examples, the second local user device 102B, upon receiving the second audio signal from the conference server 112, can store the second audio signal in a buffer on the second local user device 102B. The second local user device 102B can store the second audio signal in the buffer for 20 ms (or for a delay period other than 20 ms), delaying the comparison until after the second audio signal has been in the buffer for 20 ms.

In some examples, the local central control device 108 can receive the first audio signal from the first local user device 102A and can delay providing the first audio signal to the second local user device 102B until the local central control device 108 has stored the first audio signal on the local central control device 108 for 20 ms (or for a delay period other than 20 ms).

Figure 3:
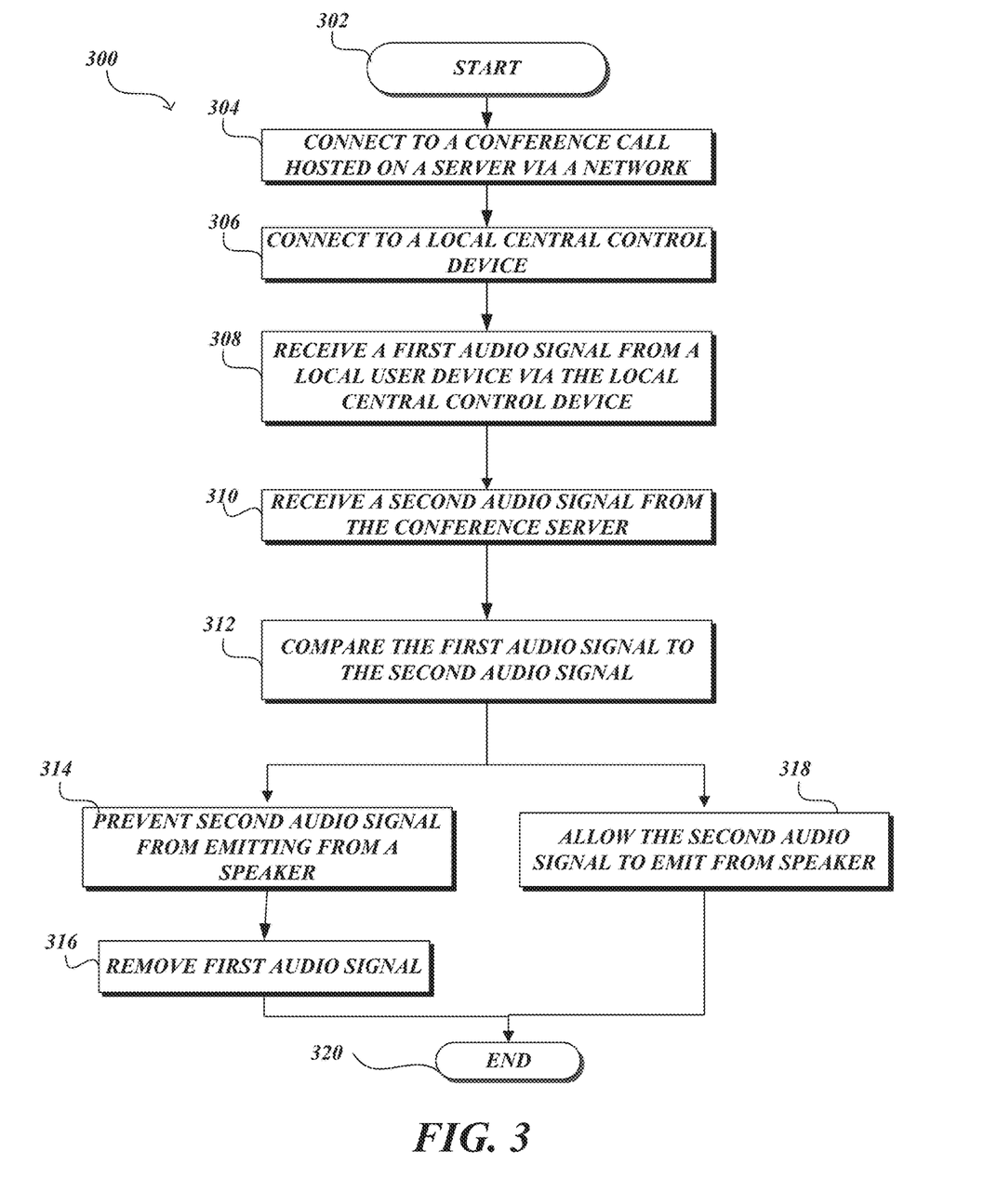
FIG. 3 is a flow diagram depicting an example routine implemented by a second local user device for connecting to a conference call via a server to limit echo.

FIG. 3 shows a flow diagram depicting an example routine implemented by the second local user device 102B for preventing or limiting echo when connecting to a conference call with the first local user device 102A. The first and second local user devices 102A and 102B connect to the conference call via the conference server 112 and to each other via the local central control device 108. Audio captured at the first local user device 102A is sent to the second local user device 102B via the local central control device 108 and via the conference server 112. The second local user device compares the audio signal received from the local central control device 108 with an audio signal received from the conference server 112 to determine whether filter, prevent, or block an audio signal from being emitted from the speaker 106B of the second local user device 102B in order to limit echo.

In some examples, the routine 300 is one of multiple routines (e.g., implemented as processor executable instructions) stored in memory of the user devices 102A-C, executed by a processor of the user devices 102A-C and used to manage various aspects of the storage drives of the user devices 102A-C. The local user devices 102A and 102B of FIG. 1 and the remote user device 102C can be connected to the local central control device 108 and may execute any of the routines described herein, such that any of the user devices 102A-C may act as a local user device or a remote user device depending on their physical location during a conference call. While FIG. 3 illustrates an example routine 300 executed by a user device acting as a second local user device, such as the second local user device 102B of FIG. 1 for comparing audio signals to limit audio echo during a conference call, the user device 102B may be sending the audio signals or may not be connected to the local central control device, and thus, may act as a first local user device 102A, a second local user device 102B and a remote user device 102C, serially, concurrently, or otherwise.

The routine 300 starts at block 302 and proceeds to block 304 where the second local user device 102B connects to a conference call hosted on the conference server 112 via the network 110. The conference call can include other participants connected to the conference call on user devices 102A. 102B, and 102C or other devices able to connect to the conference call via the conference server 112.

Next, at block 306, the second local user device 102B connects to the local central control device 108. The local central control device 108 is to connect to devices within a predetermined range. To connect with the local central control device 108, the second local user device 102B is located within the predetermined range of the local central control device 108. the second local user device 102B may connect to the local central control device 108 using communication protocols including, but not limited to satellite communication, infrared communication, broadcast radio, microwave communication, WI-FI® communication, BLU-ETOOTH® communication, and mobile communication systems, as well as others.

In some examples, the second local user device 102B, upon connection with the local central control device 108, determines the characteristics of the local central control device 108. For example, the local central control device 108 may be limited to receiving signal packets of a certain size. Upon connection with the local central control device 108, the second local user device 102B may interrogate the local central control device 108 to determine a signal size limitation, the local central control device 108 may require the signal packets to be transferred using a specific method of signal transfer, or according to a specific communication protocol. Upon connection, the second local user device 102B may interrogate the local central control device 108 to determine the communication protocol required to communicate with the local central control device 108.

In some examples, the connection may be secured using authentication. The local central control device 108 may require the second local user device 102B to establish that it is authorized to connect to the local central control device 108. Authentication may utilize authentication protocols such as transport layer security (TLS) or secure socket layer security (SSL), which may implement a handshake protocol between the local central control device 108 and the second local user device 102B. In some examples, the local central control device 108 may require information regarding a user of the second local user device 102B to establish that the user is authorized connect to the local central control device 108 and, by extension, all other local user devices 102A connected to the local central control device 108. Such information can be, but is not limited to, biometric authentication, token authentication, two factor authentication, password-based authentication, and single sign-on authentication.

Returning to FIG. 3, the second local user device 102B, at block 308, receives a first audio signal from a first local user device 102A via the local central control device 108. Upon receipt of the first audio signal, the second local user device 102B may, in some examples, cache the first audio signal in a cache, storage drive, or memory on the second local user device 102B. The cache may be stored within a memory or storage drive of the second local user device 102B. The second local user device 102B may store the first audio signal with other audio signals in the cache to be compared to audio signals received from the conference server 112. Upon determination that an audio signal received from the conference server 112 matches the first audio signal stored in the cache or memory, the second local user device 102B may delete the first audio signal from the cache or memory. In some examples, the second local user device 102B can delete the first audio signal from the cache after a time has passed that exceeds a threshold storage time. The threshold storage time is a time at which it may become unlikely to receive an audio signal from the conference server 112 that would match the first audio signal, thus allowing the second local user device 102B to remove the first audio signal from the cache or memory. In some examples, the audio signals stored in the cache or memory may be deleted as the second local user device 102B determines the need for additional storage. the second local user device 102B can determine the audio signal to delete based on criteria including, but not limited to, deleting the audio signals that were stored first, deleting the audio signals that are of a length that indicates they are likely less useful, such as extremely short audio signals, or more.

In some examples, the first audio signal may be sent to the second local user device 102B with a timestamp associated with the first audio signal that indicates the time the first audio signal was created. The second local user device 102B, may first check the timestamp to determine if too much time has elapsed since the creation of the first audio signal, such that the first audio signal may no longer be useful. In some examples, the time threshold may be updated during the conference call depending on the time it takes for audio signals to be received from user device 102A from the local central control device and/or through the conference server 112.

In some examples, the local central control device 108 may include characteristics that cause the first audio signal to be received in a different format than the audio signals received from the conference server 112. Upon receipt of the first audio signal, the second local user device 102B may transform the first audio signal to match the audio signal format received from the conference server 112.

At block 310, the second local user device 102B receives a second audio signal from the conference server 112. In some examples, the second audio signal received in a format that requires the user device 102B to transform the second audio signal before the second local user device 102B can use the second audio signal.

At block 312, the second local user device 102B compares the first audio signal to the second audio signal. The second local user device 102B compares the audio signals to determine if the first audio signal and the second audio signal correspond (e.g., if they match or are identical) or if they are distinct from each other. In some examples, the local central control device 108 may deliver the first audio signal in segments depending on the characteristics of the local central control device 108. The second local user device 102B may later compare audio signals from the conference server 112 to each segment of the first audio signal individually or may combine all segments of the first audio signal into a single signal to compare to audio signals from the conference server 112. In some examples, the second local user device 102B can compare portions of the first audio signal with portions of the second audio signal, defining how short of a portion can be considered to correspond. For example, the second local user device 102B may determine that any portion of the first audio signal that is longer than 3 or more seconds that matches or corresponds to a portion of the second audio signal of the same length, can be considered to be matching or corresponding. A portion that matches a portion of a second audio signal may be considered a corresponding portion. An audio signal that includes the corresponding portion can also include a remaining portion. The remaining portion may be the remainder of the audio signal that is not the corresponding portion. The corresponding portion can be removed from the audio signal such that it is prevented from being output with the remaining portion. The second local user device 102B may determine signals match or correspond using voice recognition, audio pattern recognition, matching data bits, Discrete Fourier transformation, Short Term Fourier Transformation, Wavelet, and Fast Fourier Transformation, time-frequency representations, logarithmic magnitude comparisons, or other techniques of signal comparison, including audio signal comparison.

In some examples, a user of the first local user device 102A and a user of the second local user device 102B of FIG. 1, can be speaking simultaneously. The conference server 112 may receive a captured audio signal from the first local user device 102A and transmit the audio signal to the second local user device 102B via the local central control device 108. Additionally, a captured audio signal from the first local user device 102A and a captured audio signal from the remote user device 102C are transmitted to the conference server 112. As both audio signals were captured simultaneously, the conference server 112 can combine the captured audio signals into a fourth audio signal to be transmitted to the second local user device 102B. The second local user device 102B, upon receiving the fourth audio signal, can compare the fourth audio signal to audio signal received from the local central control device 108. The second local user device 102B can determine that the audio signal received from the local central control device 108 matches a portion of the fourth audio signal, namely, the portion that corresponds to the audio captured at the first local user device 102B. The second local user device 102B can filter out the matching audio from the fourth audio signal and only emit the remaining audio signal from the speakers 106B of the second local user device 102B.

Upon determination by the second local user device 102B that the first audio signal and the second audio signal match or correspond, the routine 300 continues to block audio 314. At block 314, the second local user device 102B prevents the audio signal from emitting from the speaker 106B of the second local user device 102B. In some examples, the user may elect to still output the signal when using personal speakers such as ear buds or headphones where the output would not be detectable by the microphone 104A of the first local user device 102A. In such examples, the second local user device 102B may allow the second audio signal to emit from the audio output device, e.g., speaker 106B, after checking that the user had actively elected for the output to occur. At block 316, the second local user device 102B removes the first audio signal from the second local user device 102B, such that the first audio signal will no longer be compared to audio signals received from the conference server 112.

Upon determination by the second local user device 102B that the first audio signal and the second audio signal do not match or correspond, the routine 300 continues to block 318, in which the second local user device 102B allows the second audio signal to emit from the speaker 106B of the second local user device 102B. In some examples, after a time has passed in which the first audio signal does not match the second audio signal or any audio signal received by the second local user device 102B from the conference server 112, the second local user device 102B removes first audio signal from the second local user device 102B. The routine 300 then ends at block 320.

Figure 4:
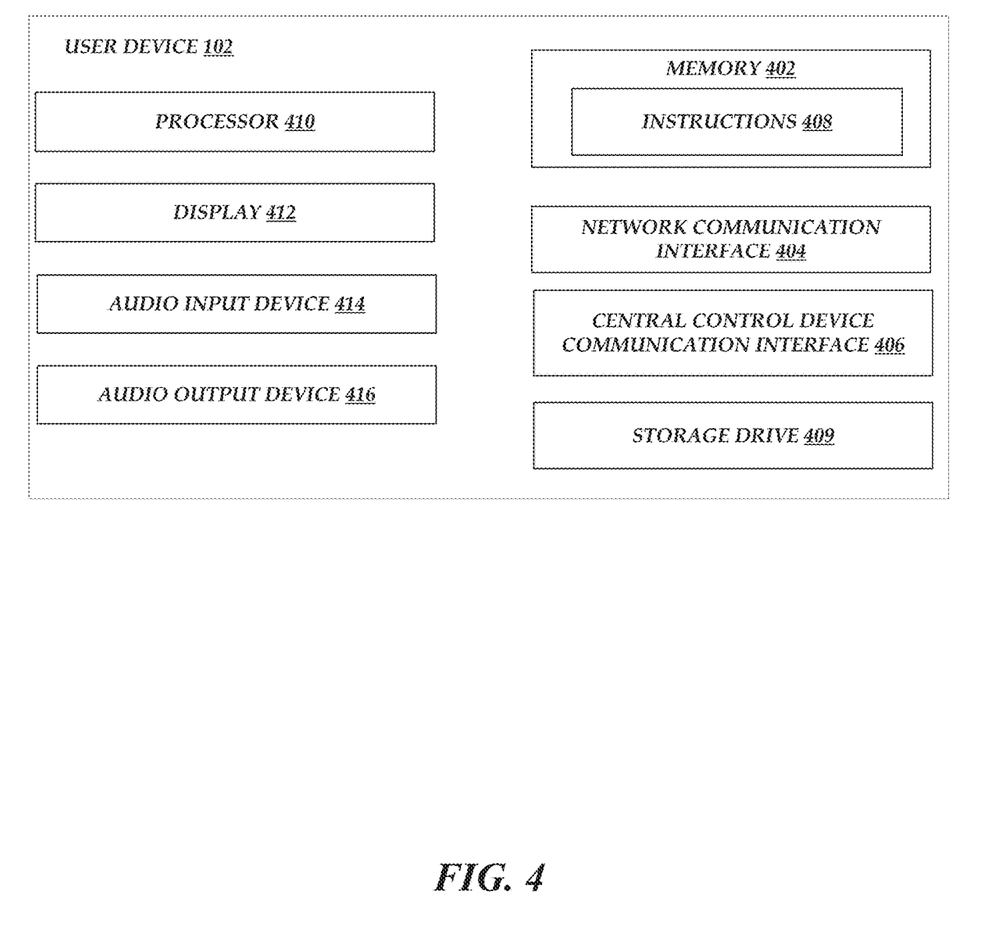
FIG. 4 is a block diagram of an example architecture of a user device that communicates with a central control device and a server to limit echo.

FIG. 4 is a block diagram of an example architecture of a user device 400 that communicates with the local central control device 108 and the conference server 112 via the network 110. The user device 400 is to receive transmitted signals (e.g., the audio signals sent by the first local user device 102A and received via the local central control device 108 and the conference server 112) and compare the transmitted signals using methods described herein to limit echo. The user device 400 may implement any of the methods or processes described herein, including the method of FIG. 3. The user device 400 may correspond to the first local user device 102A, the second local user device 102B, or the third, remote user device 103C of FIG. 1. The general architecture of user device 400 depicted in FIG. 4 includes an arrangement of computer hardware and computer-executable instructions that may be used to implement aspects of the present disclosure. In some examples, the user device 400 may include more (or fewer) components than those shown in FIG. 4. As illustrated, the user device 400 includes a display 412, processor 410, a network communication interface 404 (e.g., implemented using a card, adapter, circuit board or chip), a storage drive 409, a central control device communication interface 406, an audio input device 414 (e.g., a microphone, such as microphone 104A, 104B, 104C), an audio output device 416 (e.g., a speaker, such as speaker 106A, 106B, 106C), and a memory 402, all of which may communicate with one another by way of an internal communication bus. The network communication interface 404 may provide connectivity to networks or other communication systems, such as the Internet. The network communication interface 404 may connect the user device 400 to the conference server 112 via a network according to a first communication protocol, including any of the communication protocols described above. The processor 410 may thus receive information and instructions from other computing systems or services via the network 110.

The storage drive 409 may receive and store audio signals that are received at the central control device communication interface 406 from the local central control device 108.

The memory 402 may include computer-executable instructions 408 that the processor 410 executes in order to implement any of the methods or processes described above. The memory 402 includes RAM, ROM and/or other persistent or non-transitory memory. The memory 402 may include instructions to control the central control device communication interface 406, which may enable the user device 400 to communicate with the local central control device 108 via any of the communication protocols described above with respect to the local central control device 108. The memory may also include instructions to control the network communication interface 404, which may enable the user device 400 to connect to the conference server 112. The memory 402 may further include computer-executable instructions and other information for implementing any other processes or methods described above, including the methods described with respect to FIG. 1 and shown in FIGS. 2 and 3.

It is to be understood that not necessarily all objects or advantages may be achieved in accordance with any particular example described herein. Thus, for example, those skilled in the art will recognize that certain examples may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including specific computer-executable instructions, which are executed by a computing system. The computing system may include at least one computer or processor. The code modules may be stored in any type of non-transitory computer-readable medium or other computer storage device. Some or all the methods may be embodied in specialized computer hardware.

Many other variations than those described herein will be apparent from this disclosure. For example, depending on the example, certain acts, events, or functions of any of the algorithms described herein can be performed in a different sequence, can be added, merged, or left out altogether (e.g., not all described acts or events are necessary for the practice of the algorithms). Moreover, in certain examples, acts or events can be performed concurrently, e.g., through multithreaded processing, interrupt processing, or multiple processors or processor cores or on other parallel architectures, rather than sequentially. In addition, different tasks or processes can be performed by different machines and/or computing systems that can function together.

The various example logical blocks, components and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another example, a processor includes an FPGA or other programmable device that performs logic operations without processing computer-executable instructions. A processor can also be implemented as a combination of computing devices, e.g., a combination of a DSP and a microprocessor, a plurality of microprocessors, at least one microprocessor in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can." "could." "might," or "may," unless specifically stated otherwise, are otherwise understood within the context as used in general to convey that certain examples include, while other examples do not include, certain features, elements, and/or blocks. Thus, such conditional language is not generally intended to imply that features, elements and/or blocks are in any way required for any examples or that any example necessarily includes logic for deciding, with or without user input or prompting, whether these features, elements, and/or blocks are included or are to be performed in any particular example.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include computer-executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. An electronic device, comprising:
   a network communication interface, wherein the network communication interface is to connect the electronic device to a conference server via a first communication protocol;
   a central control device communication interface, wherein the central control device communication interface is to connect the electronic device to a local central control device via a second communication protocol;
   a microphone coupled to the electronic device; and
   a processor to:
      receive, at the microphone, audio located within an audio signal detection range of the microphone of the electronic device,
      send the audio to the local central control device via the central control device communication interface for transmission from the local central control device to a nearby electronic device, and
      send, using the network communication interface, the audio to the conference server via the first communication protocol for transmission from conference server to the nearby electronic device,
      wherein the processor is further to send the audio to the local central control device such that the audio is received by the nearby electronic device before the audio is received from the conference server by the nearby electronic device.

2. The electronic device of claim 1, wherein the processor is to:
   convert the audio to a signal transmittable to the local central control device.

3. The electronic device of claim 2, wherein the processor is to further execute computer-executable instructions to convert the audio to be transmittable by an IEEE 802.15.1 wireless standard.

4. The electronic device of claim 1, wherein the electronic device is further to receive transmitted signals at the central control device communication interface from the local central control device and the network communication interface from the conference server.

5. An electronic device, comprising:
   a network communication interface, wherein the network communication interface is to connect the electronic device to a conference server via a first communication protocol;
   a central control device communication interface, wherein the central control device communication interface is to connect the electronic device to a local central control device via a second communication protocol;
   a speaker coupled to the electronic device; and
   a processor to:
      receive, at the central control device communication interface, a first audio signal from the local central control device, wherein the first audio signal corresponds to audio from a nearby electronic device,
      receive, at the network communication interface, a second audio signal from the conference server via second communication protocol at a time after the first audio signal is received at the central control device communication interface, wherein the second audio signal corresponds to audio from the nearby electronic device,
      determine that the first audio signal corresponds to the second audio signal, and
      block output of the first audio signal via the speaker at the electronic device.

6. The electronic device of claim 5, further comprising:
   a storage drive, wherein the first audio signal is stored in the storage drive.

7. The electronic device of claim 5, wherein the processor is further to:
   remove the first audio signal and the second audio signal from the electronic device.

8. The electronic device of claim 5, wherein the first audio signal corresponds to a portion of the second audio signal.

9. The electronic device of claim 8, wherein the processor is further to:
   remove the corresponding portion of the second audio signal from the second audio signal; and
   output a remaining portion of the second audio signal from the speaker.

10. The electronic device of claim 5, wherein the first audio signal is a first signal of a plurality of signals and the electronic device is further to:
    receive a second signal of the plurality of signals and store the second signal of the plurality of signals in a storage with the first audio signal, wherein the second audio signal corresponds to the first audio signal or the second signal of the plurality of signals.

11. The electronic device of claim 5, wherein the processor is to further determine:
    that the first audio signal and the second audio signal are distinct from each other and output, at the speaker, the second audio signal.

12. The electronic device of claim 5, wherein the central control device communication interface is further to receive the first audio signal the central control device communication interface using an IEEE 802.15.1 wireless standard.

13. The electronic device of claim 12, wherein the first audio signal is transformed from the IEEE 802.15.1 wireless standard by the electronic device to match a standard of the second audio signal.

14. The electronic device of claim 5, wherein the network communication interface is further to receive the second audio signal from the conference server using an IEEE 802.11 wireless standard.

15. A non-transitory computer-readable medium including instructions that when executed by a processor cause the processor to:
- connect an electronic device to a conference via a conference server;
- connect the electronic device to a local central control device via a wireless connection;
- receive a first audio signal from the local central control device;
- receive a second audio signal from the conference server via a network at a time after the first audio signal is received via the local central control device;
- determine that the first audio signal and a portion of the second audio signal are distinct from each other; and
- output the portion of the second audio signal that is distinct from the first audio signal from a speaker coupled to the electronic device.

16. The non-transitory computer-readable medium of claim 15, further comprising instructions to cause the processor to remove the first audio signal from the electronic device after a particular time period after receiving the first audio signal.

17. The non-transitory computer-readable medium of claim 15, further comprising instructions to cause the processor to remove the first audio signal from the electronic device after a particular time period after a timestamp associated with the first audio signal.

18. The non-transitory computer-readable medium of claim 15, further comprising instructions to cause the processor to:
- receive a third audio signal from the local central control device;
- determine that the second audio signal and the third audio signal represent a same audio; and
- prevent the electronic device from outputting the second audio signal.

19. The non-transitory computer-readable medium of claim 15, wherein the instructions cause the processor to receive the first audio signal from the local central control device using an IEEE 802.15.1 wireless standard.

20. The non-transitory computer-readable medium of claim 19, wherein the instructions cause the processor to transform the first audio signal from the IEEE 802.15.1 wireless standard to match a standard of the second audio signal.

* * * * *